United States Patent
Fridrich (12) United States Patent    (10) Patent No.: US 8,131,683 B2
Fridrich    (45) Date of Patent: Mar. 6, 2012

(54) METHODS AND SYSTEMS FOR GROUP DATA MANAGEMENT AND CLASSIFICATION

(75) Inventor: Anna C. Fridrich, Basel (CH)

(73) Assignee: UBS AG, Zurich (CH)

( * ) Notice: Subject to any disclaimer, the term of this patent is extended or adjusted under 35 U.S.C. 154(b) by 385 days.

(21) Appl. No.: 12/215,392

(22) Filed: Jun. 27, 2008

(65) Prior Publication Data

US 2009/0228525 A1    Sep. 10, 2009

Related U.S. Application Data

(60) Provisional application No. 61/064,524, filed on Mar. 10, 2008.

(51) Int. Cl.
*G06F 7/00* (2006.01)
*G06F 17/00* (2006.01)

(52) U.S. Cl. ........ 707/661; 707/662; 707/665; 707/667; 707/790; 707/802; 711/100; 711/154; 711/160

(58) Field of Classification Search .................. 707/661, 707/662, 663, 664, 999.2, 999.201, 640, 707/665, 667, 790, 791, 802, 803, 999.1; 711/100, 154, 160
See application file for complete search history.

(56) References Cited

U.S. PATENT DOCUMENTS

| | | | |
|---|---|---|---|
| 6,839,680 B1 * | 1/2005 | Liu et al. | 705/10 |
| 7,461,263 B2 * | 12/2008 | Prince | 713/182 |
| 7,543,125 B2 * | 6/2009 | Gokhale | 711/162 |
| 7,594,082 B1 * | 9/2009 | Kilday et al. | 711/154 |
| 2002/0010708 A1 * | 1/2002 | McIntosh | 707/500 |
| 2003/0182304 A1 * | 9/2003 | Summerlin et al. | 707/102 |
| 2006/0106781 A1 | 5/2006 | Mori et al. | |
| 2006/0218198 A1 | 9/2006 | Brown et al. | |
| 2006/0259468 A1 | 11/2006 | Brooks et al. | |
| 2006/0282630 A1 * | 12/2006 | Hochberg et al. | 711/160 |
| 2007/0179990 A1 | 8/2007 | Zimran et al. | |
| 2007/0226267 A1 | 9/2007 | Haagenson et al. | |
| 2007/0271308 A1 * | 11/2007 | Bentley et al. | 707/200 |

OTHER PUBLICATIONS

International Search Report from the International Searching Authority in International Application No. PCT/IB2008/003385, mailed Apr. 17, 2009 (12 pages).
Notice from the European Patent Office concerning business methods. Oct. 1, 2007. (2 pages).

* cited by examiner

*Primary Examiner* — Hares Jami
(74) *Attorney, Agent, or Firm* — Finnegan, Henderson, Farabow, Garrett & Dunner LLP (57) ABSTRACT

Methods and systems are provided for retaining and managing global records of an organization. In one implementation, a method is provided for retaining global records of an organization. The method may include storing, in a memory device, at least one arrangement of data items classified according to a hierarchical classification structure providing a normalization scheme for classifying the data items, the data items comprising global data of an organization and a retention schedule corresponding to the global data. Additionally, the method may include retaining the data items according to the retention schedule, wherein the retention schedule comprises a plurality of retention rules including a global retention rule defining a first duration for retaining the data items consistent with a set of predetermined requirements, and at least one exception rule for retaining at least one data item for a second duration.

26 Claims, 9 Drawing Sheets

| FUNCTION | ACTIVITY | RECORD SERIES | DESCRIPTION | GLOBAL RULE END OF CALENDAR YEAR OF X + 10, WHERE X IS... | EXCEPTIONS END OF CALENDAR YEAR OF... | COMMENT |
|---|---|---|---|---|---|---|
| ASSET MANAGEMENT 510 | TRUST & OFFSHORE COMPANY MANAGEMENT OF OFFSHORE TRUST COMPANIES 520 | 530 | ACTIVITIES RELATED TO THE CREATION AND MANAGEMENT OF POOLS OF FUNDS AND OTHER ASSETS. | | | |
| | | DEEDS OF INCORPORATION | DOCUMENTATION OF INCORPORATION AND OTHER CONSTITUTIONAL DOCUMENTS FOR CLIENT RELATED LEGAL ENTITIES. | END OF RELEVANT ENTITY | RUSSIA - PERMANENT MEXICO - PERMANENT | |
| | | BALANCE SHEETS | FINANCIAL STATEMENTS OF ASSETS AND LIABILITIES, INCOME AND EXPENSE, CASH FLOW etc. | END OF RELEVANT ENTITY | RUSSIA - PERMANENT MEXICO - PERMANENT | |
| | FUND MANAGEMENT | | MANAGED FUND OF POOLED MONEY, RAISED FROM SHAREHOLDERS AND OPERATED BY A REGISTERED INVESTMENT COMPANY e.g. MUTUAL FUNDS (US) OR UNIT TRUSTS (UK). INCLUDES BOTH CLOSED AND OPEN END FUNDS. | | | |
| | | OFFERING & CONSTITUTIONAL RECORDS | RECORDS RELATED TO REGISTERING THE SHARES OF THE FUND WITH A REGULATORY AUTHORITY AND OFFERING THE FUND TO THE PUBLIC SUCH AS REGISTRATION STATEMENT AND FUND PROSPECTUS. INCLUDES OTHER CONSTITUTIONAL DOCUMENTS AND ONGOING ADMINISTRATION OF THE LEGAL ENTITY SUCH AS SHAREHOLDER MEETING MINUTES. | END OF RELEVANT ENTITY | FRANCE - END OF RELEVANT ENTITY +30 MEXICO - PERMANENT CHINA - END OF RELATIONSHIP +20 | |
| | | PORTFOLIO COMPOSITION & RECOMMENDATIONS | RECORDS OF PORTFOLIO HOLDINGS AND COMPOSITION VERSUS FUND GUIDELINES. BUY-SIDE ANALYST RESEARCH AND RECOMMENDATIONS CONDUCTED BY EMPLOYEES OF THE MANAGEMENT COMPANY FOR THE PURPOSE OF MAKING FUND PORTFOLIO MANAGEMENT DECISIONS. | END OF RELEVANT ENTITY | FRANCE - END OF RELEVANT ENTITY +30 CHINA - END OF RELATIONSHIP +20 | |

FIG. 5a

| FUNCTION | ACTIVITY | RECORD SERIES | DESCRIPTION | GLOBAL RULE END OF CALENDAR YEAR OF X + 10, WHERE X IS... | EXCEPTIONS END OF CALENDAR YEAR OF... | COMMENT |
|---|---|---|---|---|---|---|
| CUSTODY & SAFEKEEPING 510 | 520 | 530 | PROVISION OF CLIENT AND TRUST ACCOUNTING SERVICES FOR CUSTODY OF SECURITIES AND CASH FOR CLIENTS. THIS COVERS CUSTODY SERVICES PROVIDED BY THE BANK AND ON BEHALF OF THE BANK AS WELL AS CUSTODY AND TRANSFER AGENT SERVICES FOR MANAGED MUTUAL FUNDS. | | | |
| | CUSTODY & SAFEKEEPING | | CUSTODY SERVICES INCLUDE SECURITIES SAFEKEEPING AND COLLECTION OF DIVIDENDS AND INTEREST. | | | |
| | | CUSTODY & SAFEKEEPING RECORDS | REQUIRES EXPANSION TO REQUISITE RECORD SERIES. | | | AWAITING EXPANSION OF ACTIVITY. |
| | TRANSFER AGENCY | | | | | |
| | | SHARE & SHAREHOLDER ACCOUNTING RECORDS CORPORATE ACTION AGENCY RECORDS | ISSUANCE (INCLUDING TENDER AND SECONDARY OFFERINGS), TRANSFER AND CANCELLATION OF SHARES TO REFLECT CHANGES IN OWNERSHIP | CREATION / RECEIPT | | RECORD SERIES CREATED AFTER FIRST AND SECOND ROUNDS OF LEGAL VALIDATION - THEREFORE NO RULES FOR PHASE 1 OR 2 JURISDICTIONS. AWAIT LOCAL COUNSEL INPUT. |
| | | CORPORATE ACTION AGENCY RECORDS | RECORDS REFLECTING ACTIONS TAKEN IN RESPONSE TO CORPORATE ACTIONS SUCH AS STOCK SPLITS OR PAYMENT OF DIVIDENDS IN CASH OR STOCK DIVIDENDS, OR ACTING AS EXCHANGE AGENT (EXCHANGING A COMPANY'S STOCK OR BONDS IN A MERGER) | CREATION / RECEIPT | | RECORD SERIES CREATED AFTER FIRST AND SECOND ROUNDS OF LEGAL VALIDATION - THEREFORE NO RULES FOR PHASE 1 OR 2 JURISDICTIONS. AWAIT LOCAL COUNSEL INPUT. |

FIG. 5b

| FUNCTION | ACTIVITY | RECORD SERIES | DESCRIPTION | GLOBAL RULE END OF CALENDAR YEAR OF X + 10, WHERE X IS... | EXCEPTIONS END OF CALENDAR YEAR OF... | COMMENT |
|---|---|---|---|---|---|---|
| DEPOSIT ACCOUNT MANAGEMENT 510 | ACTIVITY 520 | RECORD SERIES 530 | MANAGEMENT AND ACCOUNTING FOR BASIC CASH AND ASSET ACCOUNTS. | | | |
| | ACCOUNT MANAGEMENT | | ACCOUNT ADMINISTRATION OF DEPOSIT ACCOUNTS. | | | |
| | | DEMAND DEPOSIT ACCOUNTS | A CLIENT ACCOUNT BALANCE WHICH, WITHOUT PRIOR NOTICE CAN BE DRAWN ON BY CHECK OR OTHER MEANS SUCH AS AUTOMATED TELLER MACHINE, TELEPHONE, BANK CARD OR COMPUTER. INCLUDES CONTRACTUAL DOCUMENTATION. | CLOSURE OF ACCOUNT | RUSSIA - END OF RELATIONSHIP +10 | |
| | | SAVING & ESCROW ACCOUNT RECORDS | ADMINISTRATION OF DEPOSIT ACCOUNTS THAT PAY INTEREST, BUT ARE TYPICALLY NOT CHEQUABLE IN CONTRAST TO A DEMAND DEPOSIT ACCOUNT. INCLUDES CONTRACTUAL DOCUMENTATION. | CLOSURE OF ACCOUNT | RUSSIA - END OF RELATIONSHIP +10 | |
| | | SAFE DEPOSIT BOX RECORDS | INFORMATION RELATED TO LOCKABLE DEPOSIT BOXES LOCATED ON PREMISES OR ARE IN THE VAULT OF A BANK THAT ARE LEASED OUT TO CUSTOMERS. INCLUDES CONTRACTUAL DOCUMENTATION. | CLOSURE OF ACCOUNT | CHINA - END OF RELATIONSHIP +10 | |
| | TRANSACTION EVIDENCE | | RECORDS AND INFORMATION RELATED TO DRAWING A DRAFT ON A DEPOSIT ACCOUNT, INCLUDING RECORDS OF THE DRAFTS THEMSELVES. | | | |
| | | CHEQUES | BILLS OF EXCHANGE OR DRAFTS, DRAWN AGAINST DEPOSITED FUNDS TO PAY A SPECIFIED AMOUNT TO A PAYEE ON DEMAND. | CREATION / RECEIPT | RUSSIA - END OF RELATIONSHIP +10<br>SINGAPORE - ACCOUNT CLOSURE +10<br>MEXICO - END OF CONTRACT +10 | |

METHODS AND SYSTEMS FOR GROUP DATA MANAGEMENT AND CLASSIFICATION

RELATED APPLICATIONS

This application claims priority from U.S. Provisional Patent Application No. 61/064,524, filed Mar. 10, 2008 and entitled "Methods and Systems for Group Data Management and Classification," the contents of which are hereby incorporated by reference.

BACKGROUND

1. Technical Field

The present invention generally relates to the storage and management of data items, preferably within a hierarchical data storage system. More particularly, the invention relates to methods and systems that store and retain relevant global records such as tax, financial, or other business records of a business organization according to a stable classification or group taxonomy or other data organization model(s).

2. Background Information

Businesses and other organizations, including brokerage firms, hospitals, educational institutions, pharmacies, newspaper agencies, governmental agencies, courts, statisticians, search engines, archeologists, museums, individuals, and investment firms (referred to hereafter as "organizations"), generate and/or receive a variety of paper documents, folders, data items, and electronic information (referred to hereafter as "records") during the course of their operation. For example, depending on the nature and/or needs of an organization, records such as educational, medical, business, tax, financial, legal, news, advertisement, sports, population, entertainment, environmental, governmental, marriage, criminal, historical, birth, death, insurance, and/or any other records linked to the organization, may be generated and/or received. Regulatory agencies and courts expect organizations to operate in an accountable manner, requiring them to retain records generated and/or received during functioning of the organization. In particular, laws, regulations, and business requirements (referred to hereafter as "requirements") govern the length of time for retaining these records. The duration for which records are retained may depend on the type of record and the requirements relevant to that record. These requirements may vary according to jurisdiction and are typically defined by local or regional regulations and laws. Because many organizations have operations in various countries, the records of such an organization are subject to different requirements, depending on the applicable jurisdictions. Non-compliance with these requirements may result in regulatory fines, criminal penalties, civil suits, and loss of business.

There exist organization models where records and the corresponding requirements are managed in spreadsheets. The spreadsheets are circulated to various teams across the organization for review and implementation. However, such a model is impractical for an organization having global operations. The current models limit the access of the records to small segments of the organization and do not provide an efficient way of accessing and managing the records globally. Moreover, ever-changing regulations and laws require frequent modification of the requirements and often stress committed IT and/or human recourses. Accordingly, such an approach is error prone and generally inefficient, thus increasing the risk of non-compliance with the requirements.

In view of the foregoing, there is a need for improved solutions for supporting record retention obligations. For example, there is a need for improved methods and systems that manage records of an organization in an efficient manner. For large organizations, there is also a need for a common global database that manages records generated and/or received during business activities related to the organization as a whole and/or displays the retention obligations of the organization.

SUMMARY

Consistent with embodiments of the invention, methods, apparatuses, and systems are provided for retaining and/or managing records of an organization. Embodiments of the invention also include methods, apparatuses, and systems for providing a common global database to store, retain, and view records stored according to a group taxonomy or other data organization model(s). In certain embodiments, a common global database is implemented that manages records generated and/or received during business activities related to the organization as a whole.

In accordance with one embodiment, a method for global data management is provided. The method comprises storing, in a memory device, at least one arrangement of data items classified according to a hierarchical classification structure providing a normalization scheme for classifying the data items. The data items include global data of an organization and a retention schedule corresponding to the global data. Further, the method includes retaining the data items according to the retention schedule. The retention schedule includes a plurality of retention rules including a global retention rule defining a first duration for retaining the data items consistent with a set of predetermined requirements, and at least one exception rule for retaining at least one data item for a second duration. The method also includes retaining the data items in the memory device until at least the expiration of the first duration and wherein specific data items are retained until expiration of the second duration if the at least one exception rule applies to the specific data items.

Consistent with another embodiment of the present invention, a method for global data management is provided. The method comprises, storing at least one arrangement of information classified according to a hierarchical classification structure providing a normalization scheme for classifying the information, the information comprising records of an organization and a retention schedule corresponding to the records, retaining the information according to the retention schedule, wherein the retention schedule comprises a plurality of retention rules including a global retention rule defining a first duration for retaining the information consistent with a set of predetermined requirements, and at least one exception rule for retaining at least one record for a second duration, wherein the information is retained until at least the expiration of the first duration and wherein specific records are retained until expiration of the second duration if the at least one exception rule applies to the specific records.

In certain embodiments, the method may also include adding new data items, deleting existing data items, and updating the retention schedule and the source data. The method may further comprise reclassifying the data items according to the hierarchical classification structure and modifications made to the data items or the retention schedule stored in the memory device and storing a log of the modifications made in the memory device. Additionally, the method may include searching for a data item based on at least one of the classification of the data items, meta data associated with the exception rule and a jurisdiction applicable to the data item.

Consistent with another embodiment of the present invention, an apparatus for global data management is provided. The apparatus comprises a memory device, storing at least one arrangement of data items classified according to a hierarchical classification structure providing a normalization scheme for classifying the data items. The data items include global data of an organization and a retention schedule corresponding to the global data. Further, the apparatus includes a data processor, coupled to the memory device, causing the memory device to retain the data items according to the retention schedule. The retention schedule includes a plurality of retention rules including a global retention rule defining a first duration for retaining the data items consistent with a set of predetermined requirements, and at least one exception rule for retaining at least one data item for a second duration. The apparatus retains all of the data items in the memory device until at least the expiration of the first duration and specific data items are retained until expiration of the second duration if the at least one exception rule applies to the specific data items.

In certain embodiments, the apparatus may also include performing at least one of adding new data items, deleting existing data items, and updating the retention schedule stored in the memory device. The apparatus may further comprise reclassifying the data items according to the hierarchical classification structure and modifications made to the data items or the retention schedule stored in the memory device. Additionally, the apparatus may also store a log of the modifications made in the memory device to track the modifications made to the data items or the retention schedule.

Consistent with another embodiment of the present invention, an apparatus for global data management is provided. The apparatus comprises a memory device storing data items. The data items include global data of an organization and a retention schedule corresponding to the global data. The retention schedule includes a plurality of retention rules including a global retention rule for retaining the data items to at least the expiration of a first duration, and at least one exception rule for retaining specific data items to expiration of a second duration, if the at least one exception rule applies to the specific data items. Further, the apparatus includes a data processor, coupled to the memory device. The data processor sends an electronic notification to a user device upon completion of at least one of the first duration and the second duration to indicate that the data items will be deleted if a response from the user device is not received within a predetermined period of time and deletes the one or more expired data items and the corresponding retention schedule from the memory device, when a response to the notification is not received within the predetermined period of time.

In certain embodiments, the apparatus may also include performing at least one of adding new data items, deleting existing data items, and updating the retention schedule stored in the memory device. The apparatus may further comprise reclassifying the data items according to the hierarchical classification structure and modifications made to the data items or the retention schedule stored in the memory device. Additionally, the apparatus may also store a log of the modifications made in the memory device to track the modifications made to the data items or the retention schedule.

Consistent with another embodiment of the present invention, a computer program product, tangibly embodied in a computer-readable storage medium, including instructions for execution by a processor for performing a method for global data management is provided. The method comprises storing, in a memory device, at least one arrangement of data items classified according to a hierarchical classification structure providing a normalization scheme for classifying the data items. The data items include global data of an organization and a retention schedule corresponding to the global data. Further, the method includes retaining the data items according to the retention schedule. The retention schedule includes a plurality of retention rules including a global retention rule defining a first duration for retaining the data items consistent with a set of predetermined requirements, and at least one exception rule for retaining at least one data item for a second duration. The method also includes retaining all of the data items in the memory device until at least the expiration of the first duration and wherein specific data items are retained until expiration of the second duration if the at least one exception rule applies to the specific data items.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this specification, illustrate various embodiments of the invention and together with the detailed description, serve to explain the principles of the invention. In the drawings:

FIGS. 5a-5c illustrate examples of information retained in an embodiment of a mass storage device;

DETAILED DESCRIPTION OF THE EMBODIMENTS

In the following description, for purposes of explanation and not limitation, specific techniques and embodiments are set forth, such as particular sequences of steps, interfaces and configurations, in order to provide a thorough understanding of the techniques presented herein. While the techniques and embodiments will primarily be described in context with the accompanying drawings, those skilled in the art will further appreciate that the techniques and embodiments can also be practiced in other systems and environments.

Those skilled in the art will further appreciate that the functions explained herein below may be implemented using software functioning in conjunction with a programmed microprocessor or general purpose computer. It will also be appreciated that while the following techniques and embodiments are primarily described in the form of methods and apparatuses, the techniques and embodiments may also be implemented in computer program products as well as in systems comprising a computer processor and a memory coupled to the processor, wherein the memory is encoded with one or more programs that may realize the functions disclosed herein.

Figure 1:
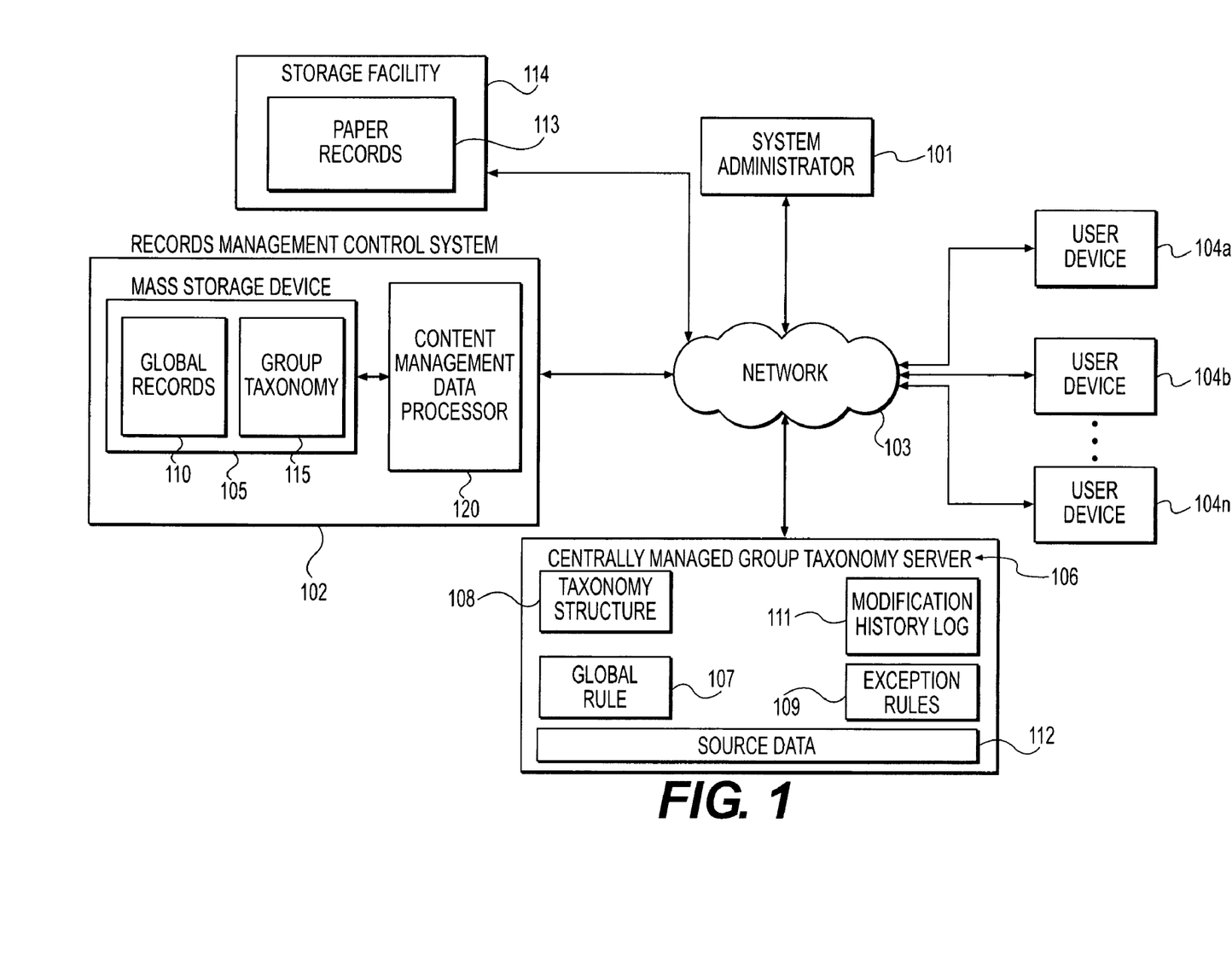
FIG. 1 is a block diagram of an exemplary system configuration for managing and retaining records of an organization, consistent with an embodiment of the invention.

FIG. 1 is a block diagram of an exemplary system configuration 100, consistent with an embodiment of the present invention. System 100 facilitates management and retention of records, generated and/or received by an organization during the course of operation, on a group-wide or global basis. Specifically, the components of system 100 are adapted to aggregate organization records received from a plurality of organization employees, business users, application programs, computer systems, clients, user devices or the like (referred to hereafter as "entities") located globally. Further, one or more components may be provided in system 100, enabling the system to retain each record of the entity for a duration necessitated by one or more requirements relevant to the retained record.

As shown in FIG. 1, system 100 includes a communication network 103 that facilitates communication between a plurality of nodes 101, 102, 104a-n, and 106. Each node comprises of a combination of one or more application programs and one or more hardware components. For example, application programs may include software modules, sequences of instructions, routines, data structures, display interfaces, and other types of structures that execute operations of the present invention. Further, hardware components may include a combination of Central Processing Units (CPUs), buses, memory devices, storage units, data processors, input devices, output devices, network interface devices and other types of components that will become apparent to those skilled in the art.

In the embodiment of FIG. 1, the global data organization model(s) are in the form of a group taxonomy. More specifically, system 100 includes a server 106 which provides the system with a centrally managed group taxonomy. Server 106 may receive a global rule 107, exception rules 109, and source data 112 from the system administrator 101, via network 103. Alternatively, server 106 may receive retention schedules from system administrator 101. The retention schedules may be generated by system administrator 101 based on the requirements and after harmonizing various time durations indicated in the requirements.

The system administrator 101 can be one or more of compliance officers, managers, legal experts, and/or multiple legal departments. Using received source data 112, server 106 may generate meta data to link source data 112 to taxonomy structure 108, which provides a classification scheme to various nodes in system 100. As described in greater detail below, taxonomy structure 108 provides a normalization scheme for classifying organizational records, such as indicating the types of records and the structure according to which the records should be stored. The taxonomy structure may be implemented on a global basis, throughout the organization. Rules and taxonomy structure 108 can be modified in the server 106 by system administrator 101 or users authorized by system administrator 101. Other forms of data organization model(s) are also possible, depending on the nature of the records and/or needs of the organization for retaining such records.

Depending on information provided to server 106 by system administrator 101, server 106 sends generated retention schedules or global rule 107 and exception rules 109 with taxonomy structure 108 including meta data, to records management control system 102, via network 103. Further, server 106 also sends taxonomy structure 108 to user devices 104a-n. User devices 104a-n may comprise one or more of a communication device or computing device or platform, such as a fax machine, computer, laptop, server, mainframe and the like. By way of example, such user devices may represent various entities and/or users that are located globally and generate and/or receive records that are relevant to the entity. The taxonomy structure 108 is sent to user devices 104a-n to implement a uniform classification scheme in the organization. Records generated and/or received by user device 104a-n may be classified according to record types, as identified by received taxonomy structure 108, and sent to records management control system 102, via network 103. User device 104a-n may also generate and/or receive paper records and send the paper records 113 to storage facility 114, via mail or fax.

After receiving retention schedules including global rule 107, exception rules 109, taxonomy structure 108 including meta data, and records via network 103, content management, data processor 120 uses the received retention schedules or may generate retention schedules for each record type, includes the retention schedules in group taxonomy 115, and stores each record in mass storage device 105 based on the corresponding retention schedule. Retention schedules corresponding to paper records may also be provided to system administrator 101, storage facility 114, user devices 104a-n, and users or entities of the organization via network 103, for providing guidelines to store paper records 113 in storage facility 114.

Content management data processor 120 functions continuously as new records are received on a continuous basis. Mass storage device 105 may include all forms of non-volatile or volatile memory, including by way of example semiconductor memory devices, such as EPROM, RAM, ROM, DRAM, EEPROM, and flash memory devices; magnetic disks such as internal hard disks and removable disks; magneto-optical disks; and CD-ROM disks.

Mass storage device 105 stores global records 110 and group taxonomy 115. Global records 110 may be retained in mass storage device 105, according to a corresponding retention schedule in group taxonomy 115. As will be described in greater detail below, group taxonomy 115 includes taxonomy structure 108, received from server 106. Taxonomy structure 108 identifies the types of records, the retention schedule for each type of record, and meta data associated with each retention schedule. The retention schedule controls the length of time for which global records 110 are retained in mass storage device 105 and may indicate the length of time paper records 113 are stored in storage facility 114. The meta data may specify the length of time for which each record is retained by tracing the retention schedule to source data stored in server 106. Further, when the length of time associated with the retention duration of a record has elapsed, content management data processor 120 may send an electronic and/or paper notification to at least one of storage facility 112, users or entities of the organization and, user devices 104a-n, depending on the origination device and/or application program of the expired record. For example, the electronic notification is sent to one of the user devices 104a-

*n*. Further, at least one of user devices 104*a*-*n* may respond to the notification and attempt to modify the retention schedule. However, if at least one of user devices 104*a*-*n* does not respond to the notification within a set period of time, indicated by the notification, content management data processor 120 will delete the expired record from mass storage device 105. The set period of time can be set by system administrator 101 and provided to records management control system 102, via network 103. Although the set period of time in the present embodiment is described as being the same duration for all records, one skilled in the art will appreciate that different durations can be associated with different types of records and incorporated into taxonomy structure 108.

One or more of user devices 104*a*-*n*, such as a system administrator 101 may send a request to content management data processor 120 to search and retrieve a specific record from global records 110 or to identify the location of a paper record. The search criteria may be one or more of a record type, record classification, and meta data associated with the retention schedule. System administrator 101 or user devices 104*a*-*n* may access server 106 and modify one or more of global rule 107, exception rules 109, and associated source data 109. Modifications may include adding records, deleting records, and/or updating rules. Prior to making modifications, user devices 104*a*-*n* require authorization from system administrator 101 or permission may have been previously given to certain users or user devices 104*a*-*n*. Modifications made in server 106 may be stored in modification history log 111 to record, for example, information concerning the modification(s) made, the date of the modification(s), and/or an identification of the user, user device, or system administrator 101 who made the modification(s). Also, system administrator 101 can review all modifications and revert the changed global rule 107, exception rules 109, associated source data 112, to the state prior to a specific modification. When a modification is made in server 106, modification information may be sent to records management control system 102, where content management data processor 120 updates the retention schedule and the associated meta data in group taxonomy 115. Updating the retention schedule may include updating the length of time for which records associated with the retention schedule are stored.

Figure 2:
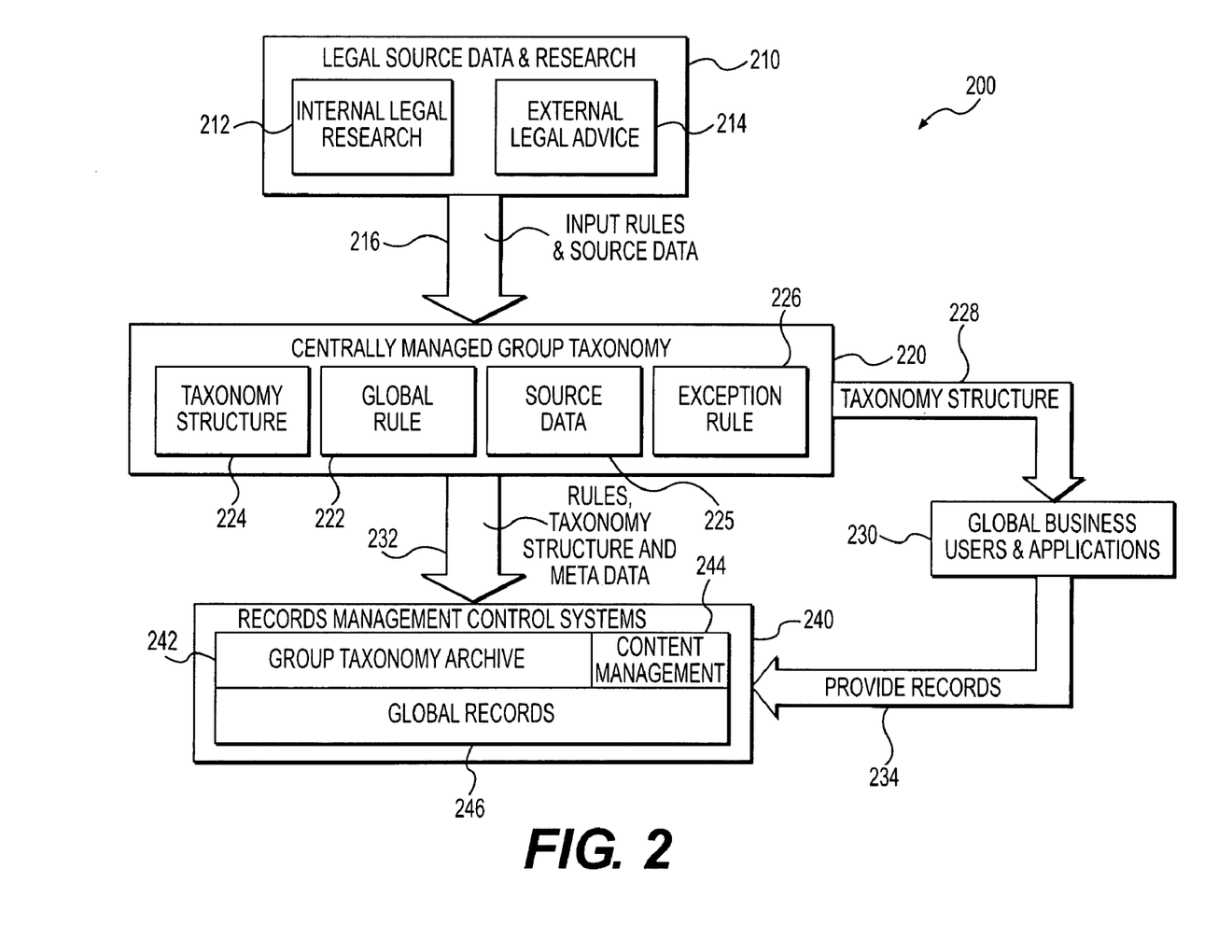
FIG. 2 illustrates an exemplary structure of an organization implementing a system, consistent with an embodiment of the invention.

Referring now to FIG. 2, an exemplary diagram is presented of the exchange of information in an organization implementing a system consistent with an embodiment of the present invention. Legal source data and research 210 may indicate the functions of system administrator 101, as explained above. Through internal legal research 212 and external legal advice 214, legal experts of the organization create a plurality of rules, corresponding source data, and generate retention schedules using the plurality of rules. The source data provides justifications for the rules by linking the generated rules to one or more of the requirements. In step 216, retention schedules or rules and corresponding source data 225 may be provided to centrally managed group taxonomy 220, which already contains group taxonomy structure 224 of the organization. Using source data 225, centrally managed group taxonomy 220 generates meta data to link source data 225 to group taxonomy structure 224. In step 228, centrally managed group taxonomy 220 sends group taxonomy structure 224 including meta data, to global business users and applications 230 of the organization. Business users and applications 230 may perform various functions of the organization and continuously provide records 234 classified by record type based on received taxonomy structure 228, to records management control system 240, for retention in records management control system 240 or in a storage facility (not shown). In step 232, centrally managed group taxonomy 220, sends a plurality of rules 222 and 226 and taxonomy structure 224 including meta data, to records management control system 240.

Using the received retention schedules or rules, content management 244 may use the retention schedule or generate a retention schedule using the received rules for each record type and store each record in records management control system 240 based on the corresponding retention schedule. Retention schedules may also provide guidelines and schemes to business users for storing records in, for example, a storage facility. The retention schedules are associated with the received taxonomy structure 232. Both the retention schedule and received taxonomy structure 232 including meta data, are stored in group taxonomy 242. The meta data indicates a justification for each retention schedule by linking the retention schedule with source data stored in centrally managed group taxonomy 220. As described in greater detail below, each retention schedule may contain a global rule 222, a first trigger event, and when required an exception rule 226, and a second trigger event. The retention schedule may indicate a time period for which a record type will be retained and a trigger event indicating a starting point of the time period. Global records 246 are retained in records management control system 240, based on a retention time indicated by the retention schedule associated with each record and paper records are stored in a storage facility based on guidelines provided by the retention schedules. By using the received taxonomy structure 232 to identify the retention schedule associated with the type of record received from global business users and applications 230, content management 244 may retain each record based on a retention period indicated by the retention schedule.

Figure 3:
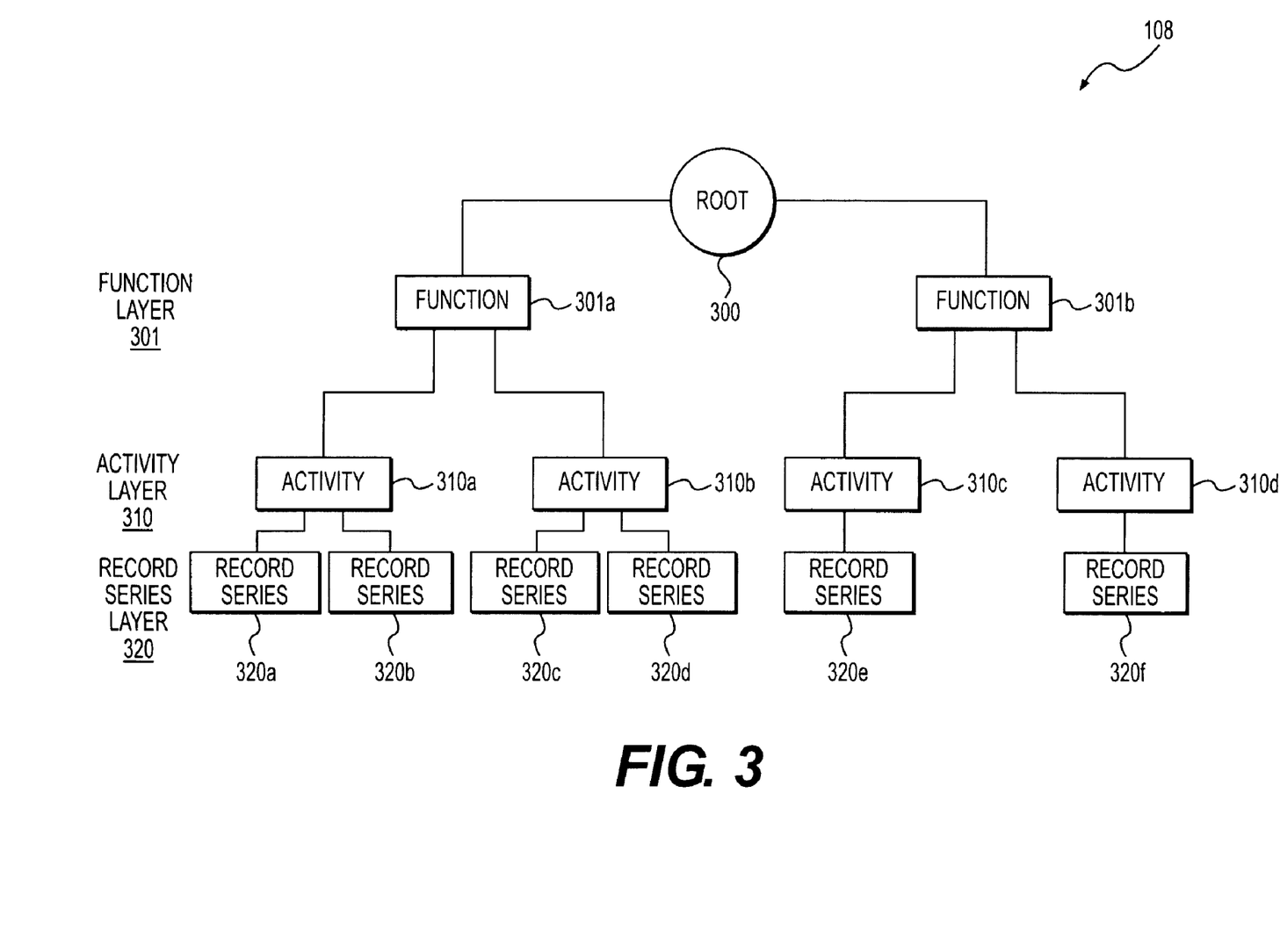
FIG. 3 is a schematic depicting a technique for classifying records of an organization, consistent with an embodiment of the invention.

FIG. 3 illustrates an exemplary taxonomy structure 108 that is implemented on a global basis in the organization. It will be recognized that the structure in FIG. 3 need not be strictly adhered to but that various changes and modifications may suggest themselves to one skilled in the art. Each layer includes one or more categories and can be customized according to the operations of an organization.

Figure 5B:
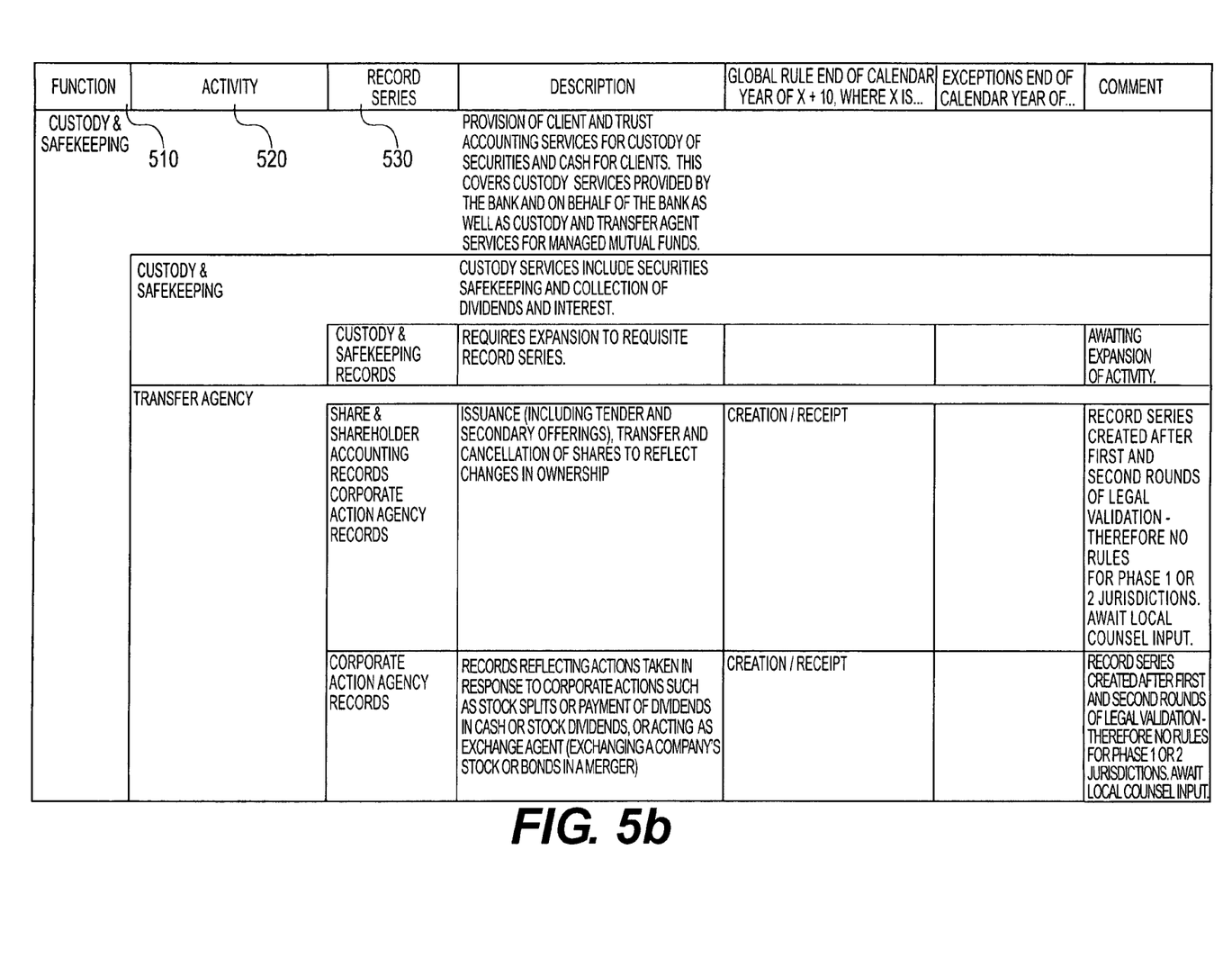
Figure 5C:
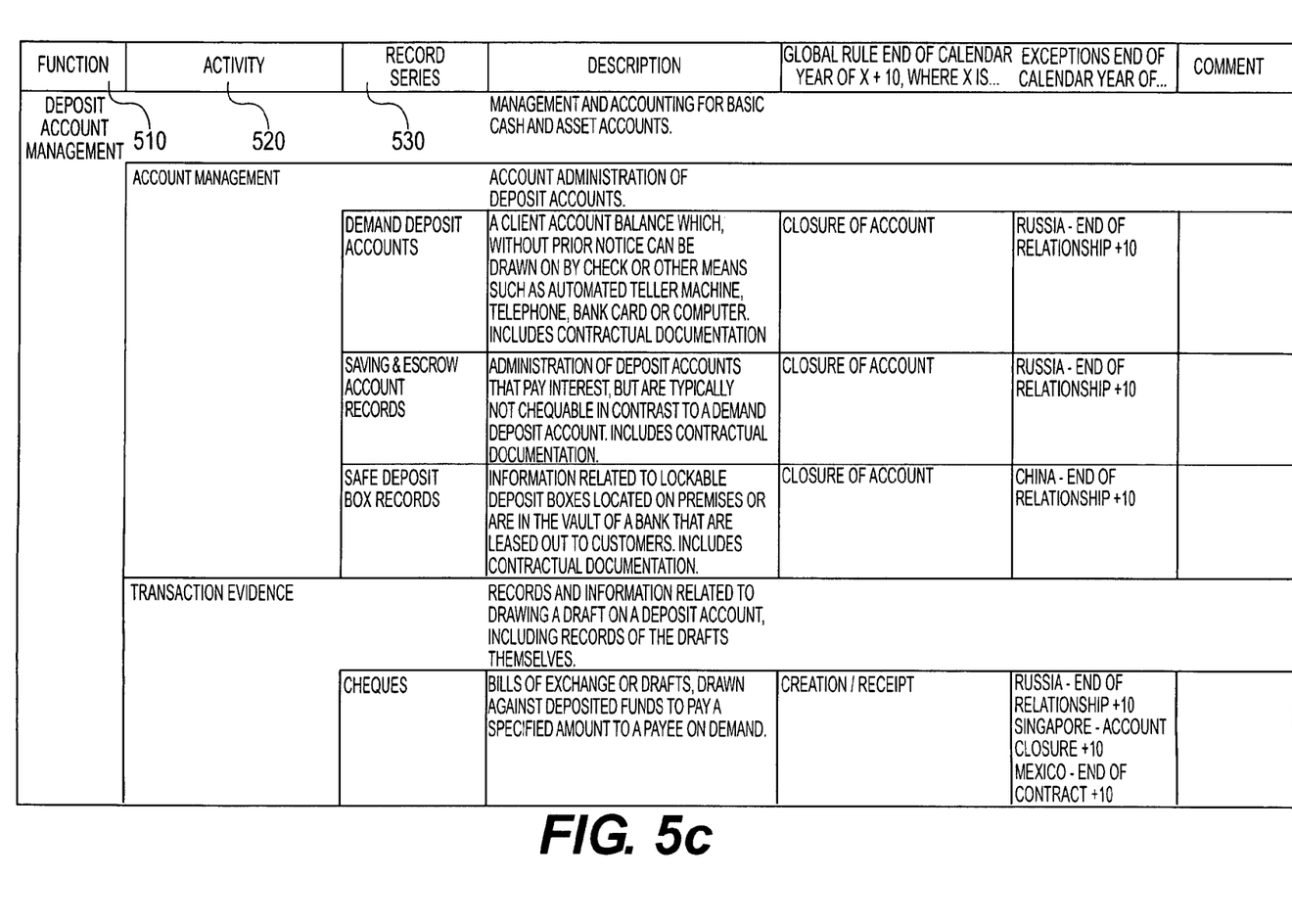

As shown in the exemplary embodiment of FIG. 3, taxonomy structure 108 is organized in a hierarchical manner based on the activities of the organization. Taxonomy structure 108 provides a normalized representation of the functions of the organization. As illustrated in FIG. 3, there are three layers below root 300 of the hierarchy. As is illustrated in FIGS. 5*a*-*c*, each layer comprises descriptive meta data and functional meta data. Function layer 301, is the first layer that describes the various operations of the business. For example, function 301*a* or 301*b* may include functions for managing employees, clients, counter parties, and external networks, product management, advisory, asset management, custody and safekeeping, governance, trading, manage facilities and infrastructure, manage business risk, strategic human resources, and/or any other functions performed by the organization. Activity layer 310, is the second layer and each activity 310*a*-*d*, has a parent function from class function 301*a*-*b*. Additionally, each activity 310*a*-*d* describes the activities of its parent from class function 301*a*-*b* and can inherit the properties of its parent. For example, when function 301*a* is "manage employees" then activity 310*a* may be one of employee performance and absence, employ personal, occupational health, contract and compensate personnel, employee pensions and activity 310*b* may be one of employee education and training, employee performance and absence, employee disciplinary, employee grievance, employee cessation and any other activities encompassed by function manage employees.

The third layer in FIG. 3 is record series layer 320. Each record series 320a-n has a parent in class activity and it identifies the types of records produced as a result of its parent. For example, when activity 310a is employee performance and absence, record series 320a may be one of organizational job history, employee assessment records, absenteeism and any other record types produced under employee performance and absence. The retention schedule for each record is associated with the record series layer 320.

Returning to FIG. 1, content management data processor 120 receives taxonomy structure 108 and stores it in global taxonomy 115. User devices 104a-n send records, which are classified according to record types, as identified by the record series layer in the taxonomy structure received by the user devices 104a-n, to content management data processor 120 and/or to storage facility 114. User devices 104a-n also send information to content management data processor 120 indicating the classification of the records sent to storage facility 114 Content management data processor 120 matches the type of record with the corresponding record series in group taxonomy 115 to retain the record in global records 110 and can also provide guidelines to store paper records 113 according to a time period identified by the retention schedule associated with the corresponding record series.

Figure 4:
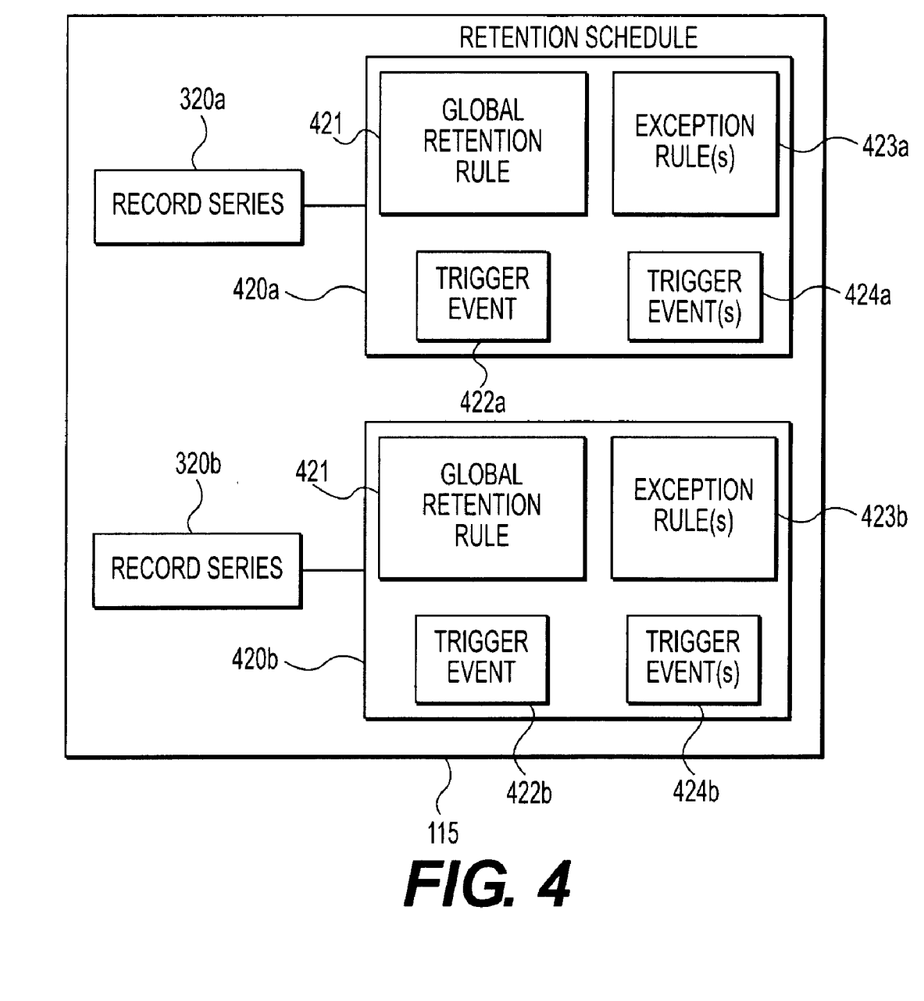
FIG. 4 is a detailed diagram of an exemplary group taxonomy structure, consistent with an embodiment of the invention.

FIG. 4 shows an exemplary embodiment of group taxonomy 115. As discussed above, record series 410a-410b identifies the type of records generated by parent activity classes. Record types in record series 410a-b have corresponding retention schedules 420a-b, which are associated with the record series level of group taxonomy. Retention schedule 420a includes a global retention rule 421, which indicates a time period for which all records will be retained, and a trigger event 422a indicating the starting point of the time period. Global retention rule 421 is a default rule created by legal experts in the organization and the time period indicated by the global retention rule 421, is the same in all retention schedules. Legal experts and/or authorized users in the organization may set the time period corresponding to global retention rule 421 to any numerical value, such as 0 days from a trigger event, 1 year from a trigger event, or 20 years from a trigger event. Records not falling squarely within record types indicated by record series 410a-410b, are identified by record type taxonomy structure and retained for at least the time period indicated by global retention rule 421 or they can be deleted immediately.

Where one or more requirements of the organization necessitate that certain record types identified by record series 410a be retained for a longer duration than the time period indicated by global retention rule 421, retention schedule 420a includes one or more exception rules 423a and corresponding trigger events 424a. Each exception rule indicates a time period that may be set to a numerical value less than, equal to, or greater than the time period indicated by global retention rule 421, and can be later modified based on any changes in the requirements of the organization. For, example, legal experts and/or authorized users in the organization may be aware of a pending amendment to a law that effects the requirements of the organization. In such a case, the legal experts may temporarily set the time period corresponding to global retention rule 421 to expire at the same time as the time period corresponding to exception rules 423a-b and, thereafter, upon receiving notice of the approval or disapproval of the legal amendment, modify the time periods corresponding to global retention rule 421 and exception rules 423a-b.

Trigger events 424a indicate the starting points of time periods indicated by the exception rules. The exception rules may be triggered during or at the end of the time period indicated by the global retention rule. Exception rules 423a may also be triggered instead of the global rule 421, at the instant when a certain record is first created, if it is determined that the time duration indicated by the global rule does not satisfy one or more requirements of the organization. The retention schedule may enable retention of different records for different time durations depending on the types of records. Examples of global retention rule 421, exception rules 423a-b, and trigger events 424a-b are provided in FIGS. 5a-5c.

Referring now to FIGS. 5a-5c, function layer 510 includes, as an example, asset management, custody and safekeeping, and deposit account as functions performed by the organization. Activity layer 520 includes, as an example, trust and offshore company management of offshore trust companies, fund management, custody and safekeeping, transfer agency, and account management, transaction evidence. Each activity 520 belongs to a parent in class function 510 and inherits the properties of its parent. Record series layer 530 includes, for example, deeds of incorporation, balance sheets, offering and constitutional records, portfolio composition and recommendations, custody and safekeeping records, share and share holder accounting records, corporate action agency records, demand deposit accounts, saving and escrow account records, safe deposit box records, and/or checks. Each record series 530 belongs to a parent in the class activity 520 and inherits the properties of its parent. Descriptions of records and rules are provided using functional meta data and descriptive meta data. For example, a global rule may be designated by X+10 years, where X is a trigger event which is one of an end of relevant entity, closure of account, and creation/receipt. As illustrated in FIGS. 5a-c, exception rules may specify a jurisdiction, a trigger event, and a time duration. For example, when Russia or China is a relevant jurisdiction, account closure or end of relationship may be a trigger event, and 20 or 30 years may be the time duration. It will be recognized that the examples in FIGS. 5a-c need not be strictly adhered to and that various changes and modifications can be made consistent with the present invention.

Figure 6:
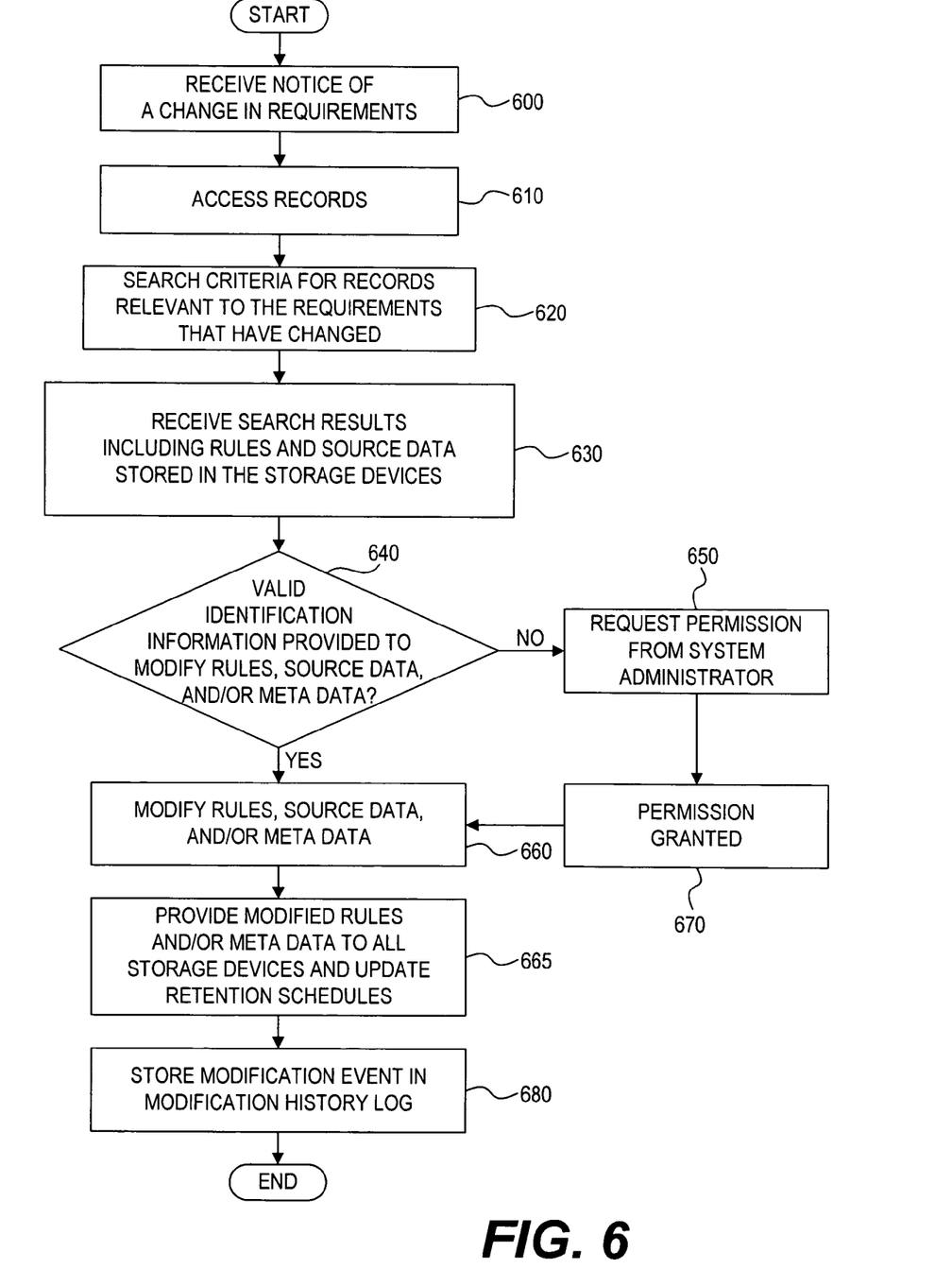
FIG. 6 shows a flow diagram of an exemplary method for searching for records stored in a mass storage device and modifying a retention schedule of selected records, consistent with an embodiment of the invention.

FIG. 6 shows a flow diagram of an exemplary method for searching and modifying information stored in a system. Modifying information includes adding, deleting, and/or updating information. The method starts in step 600 where a user or member of the organization receives notice of a change in the requirements. The notice can be a business correspondence, interoffice memorandum, email, news article, governmental correspondence or the like. In step 610, the member of the organization uses a user device (see, e.g., user devices 104a-n in FIG. 1) to access records stored in storage device(s) of the organization or determine the storage location of a particular record. Such a storage device or location may be records management control system 102, server 106, or storage facility 114 of FIG. 1. Next, in step 620, the member provides search criteria for records relevant to the requirements that have changed. The search criteria may be meta data tracing rules to corresponding source data. The system uses the search criteria to return all the records that are related to the search criteria. For example, based on the search criteria, system 100 of FIG. 1 returns source data 107 and rules stored in records management control system 102.

In step 640, the member provides valid identification information, such as through a computer or other user device. To modify rules, source data and/or meta data, the member may be given prior authorization from a manager or the like in the organization. For example, system administrator 101 in FIG.

1 provides access to various records, stored in records management control system 102 and rules stored in server 106, to members of the organization depending on the roles of each member in the organization. If the member does not have prior permission or a valid identification, then he/she may seek permission from system administrator (step 650) to make modifications if permission is granted (step 670). On the other hand, if the member has prior permission, the retention rules, associated source data, and/or meta data can be modified directly in step 660. In step 665, the modifications will be sent to the appropriate storage devices in the system and/or to business users of the organization. For example, centrally managed group taxonomy 106 may send the modified rules to records management control system 102, where content management data processor 120 will update retention schedules, in group taxonomy 115 and reclassify global records 110, based on the modifications. In step 680, a record of all modifications is stored in a history log for the system administrator to review. As an example, server 106 of FIG. 1 may store a modification history log 111.

Figure 7:
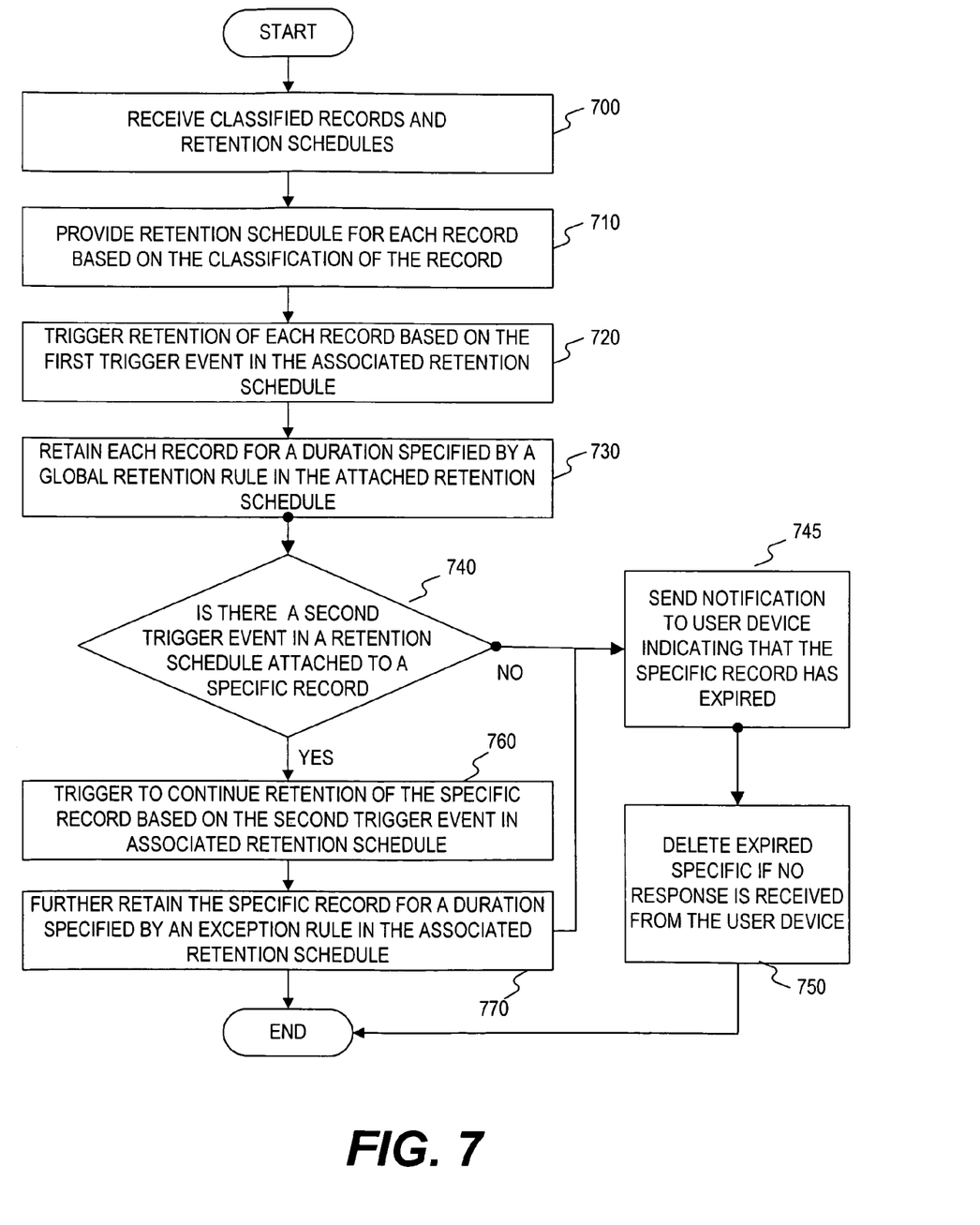
FIG. 7 shows a flow diagram of an exemplary method for retaining records in a mass storage device and deleting expired records from the mass storage based on retention schedules for the records, consistent with an embodiment of the invention.

FIG. 7 shows a flow diagram of an exemplary method for retaining and deleting records based on retention schedule(s) for the records. The method starts in step 700 where a processor in the system receives classified records and one or more retention schedules. The records are generated and/or received by the organization and classified according to a classification scheme of the organization. The retention schedules may include retention rules and trigger events, similar to retention schedules 420a-b discussed above with reference to FIG. 4. In step 710, a retention schedule is provided or associated with each record, based on the classification of each record. Next, in step 720, the processor triggers the retention of each record, in a memory device of the system, based on the first trigger event in the associated retention schedule. Such a memory device may be similar to mass storage device 105 illustrated in FIG. 1. Further, the first trigger event can be the start of a calendar year, the time of the creation of record, end of a quarter within the organization, or any other date satisfying the requirements of the organization. The method proceeds to step 730, where each record is retained in the memory device of the system for a duration specified by a global retention rule in the associated retention schedule. Each retention schedule may include a global retention rule which indicates a time duration that is, for example, an average time period of all the requirements that the organization wants to satisfy. For example, all retention schedules may include a global retention rule, which indicates that each record shall be retained in the memory device of the system for a period of ten years.

In step 740, the retention schedule for a specific record is checked for a second trigger event. For example, the retention schedule may be checked for a second trigger event at the end of the duration specified by the global retention rule or it may be automatically triggered. Additionally, or alternatively, the retention schedule for each record may be checked for a second trigger event before the method proceeds to the next step. If the retention schedule for a specific record does not include a second trigger event, then the method moves to step 745 where an electronic notification is sent to a user device indicating that the specific record has expired. The user can choose to respond to the notification or ignore the notification. If no response is received from the user device, the processor may delete the expired specific record from the memory device of the system (step 750).

On the other hand, if the retention schedule for a specific record includes a second trigger event the method moves to step 760, where the processor triggers to continue retention of the specific record based on the second trigger event in the associated retention schedule. For example, the second trigger event may be triggered at the end of the time duration specified by the global retention rule in the associated retention schedule or during the time duration period specified by the global retention rule in the associated retention schedule. Thereafter, in step 770, the specific record is further retained in the memory device of the system for a duration specified by an exception rule in the retention schedule. The exception rule may indicate that a specific record shall be retained for a time duration longer than the time duration indicated by the global retention rule. For example, if the time duration indicated by the global record is ten years, the exception rule may specify that a specific record is retained for two additional years after the elapse of the ten years. Further, the exception rule may specify that a specific record shall be retained for four years after the elapse of eight years of the ten year period indicated by the global retention rule, such that the second trigger event triggers the beginning of the four year duration at the end of eight years.

At the elapse of the duration specified by the exception rule the method may move to step 745, where an electronic notification, about the expiration of the specific record, is sent to a user device and the specific record is thereafter deleted at 750, as described above.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include retention of tax and other business records, but systems and methods consistent with the present invention may be implemented for retaining records such as educational, medical, business, tax, financial, population, legal, news, advertisement, sports, entertainment, environmental, climate, governmental, marriage, criminal, historical, birth, death, and/or insurance records. Further, embodiments of the invention may be applied to manage and retain any other records linked to organizations, such as hospitals, universities, schools, pharmacies, newspaper agencies, governmental agencies, courts, statisticians, search engines, archeologists, museums, and/or any individual interested in keeping records that fall within a certain category. Moreover, the described implementations include software, but systems and methods consistent with the present invention may be implemented as a combination of hardware and software or in hardware alone. Examples of hardware include computing or processing systems, including personal computers, servers, laptops, mainframes, micro-processors and the like.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for global data management, comprising:
storing, in a memory device, at least one arrangement of data items classified according to a hierarchical classification structure providing a normalization scheme for classifying the data items, the data items comprising global data of an organization and a retention schedule corresponding to the global data, wherein the hierarchical classification structure corresponds to a taxonomy database schema that includes:

a function layer defining a business of the organization and a parent function node of the organization, the function layer being associated with a first level in the hierarchical classification structure;

an activity layer defining business processes of the function layer and an activity node corresponding to the parent function node, the activity layer being associated with a second level that is lower than the first level in the hierarchical classification structure; and a record series layer defining the global data produced by the business processes and including a record series node that is a child of the activity node, the record series node identifying a type of record generated based on execution of an activity corresponding to the activity node, the record series layer being associated with a third level, wherein the third level is lower than the second level in the hierarchical classification structure and the retention schedule is assigned to the global data in the record series layer; and retaining the data items according to the retention schedule, wherein the retention schedule comprises a plurality of retention rules including a global retention rule defining a first duration for retaining the data items consistent with a set of predetermined requirements, and at least one exception rule for retaining at least one data item for a second duration, wherein the data items are retained in the memory device until at least the expiration of the first duration and wherein specific data items are retained until expiration of the second duration if the at least one exception rule applies to the specific data items.

2. The method of claim 1, wherein the set of predetermined requirements includes at least one of a local jurisdictional requirement, a business requirement, and a legal requirement.

3. The method of claim 1, wherein the retention schedule further comprises a first trigger event that defines, when triggered, a start date of the first duration that is associated with the global retention rule, and a second trigger event that defines, when triggered, a start date of the second duration, associated with the at least one exception rule.

4. The method of claim 1, wherein the retention schedule further comprises:

tracing, based on source data, the global retention rule and the at least one exception rule to at least one of a local jurisdictional law, a business requirement, and a global legal requirement.

5. The method of claim 4, further comprising at least one of adding new data items, deleting existing data items, and updating the retention schedule and the source data.

6. The method of claim 5, further comprising reclassifying the data items according to the hierarchical classification structure and modifications made to the data items or the retention schedule stored in the memory device.

7. The method of claim 6, further comprising storing a log of the modifications in the memory device to track the modifications made to the data items or the retention schedule.

8. The method of claim 1, further comprising using one of the classifications of data items, meta data associated with the plurality of rules, and jurisdictions applicable to data items, as search criteria to search for data items retained in the memory device.

9. The method of claim 1, wherein the first duration is less than, equal to, or greater than the second duration.

10. An apparatus for global data management comprising:

a memory device, storing at least one arrangement of data items classified according to a hierarchical classification structure providing a normalization scheme for classifying the data items, the data items comprising global data of an organization and a retention schedule corresponding to the global data, wherein the hierarchical classification structure corresponds to a taxonomy database schema that includes:

a function layer defining a business of the organization and a parent function node of the organization, the function layer being associated with a first level in the hierarchical classification structure;

an activity layer defining business processes of the function layer and an activity node corresponding to the parent function node, the activity layer being associated with a second level that is lower than the first level in the hierarchical classification structure; and a record series layer defining the global data produced by the business processes and including a record series node that is a child of the activity node, the record series node identifying a type of record generated based on execution of an activity corresponding to the activity node, the record series layer being associated with a third level, wherein the third level is lower than the second level in the hierarchical classification structure and the retention schedule is assigned to the global data in the record series layer; and a data processor, coupled to the memory device, causing the memory device to retain the data items according to the retention schedule, wherein the retention schedule comprises a plurality of retention rules including a global retention rule defining a first duration for retaining the data items consistent with a set of predetermined requirements, and at least one exception rule for retaining at least one data item for a second duration, wherein the data items are retained in the memory device until at least the expiration of the first duration and wherein specific data items are retained until expiration of the second duration if the at least one exception rule applies to the specific data items.

11. The apparatus of claim 10, wherein the set of predetermined requirements includes at least one of a local jurisdictional requirement, a business requirement, and a legal requirement.

12. The apparatus of claim 10, wherein the retention schedule further comprises a first trigger event that defines, when triggered, a start date of the first duration that is associated with the global retention rule, and a second trigger event that defines, when triggered, a start date of the second duration that is associated with the at least one exception rule.

13. The apparatus of claim 10, wherein the retention schedule further comprises:

tracing, based on source data, the global retention rule and the at least one exception rule to at least one of a local jurisdictional law, a business requirement, and a global legal requirement.

14. The apparatus of claim 13, wherein the data processor causes the memory device to perform at least one of adding new data items, deleting existing data items, and updating the retention schedule and the source data.

15. The apparatus of claim 14, further comprising reclassifying the data items according to the hierarchical classification structure and modifications made to the data items or the retention schedule stored in the memory device.

16. The apparatus of claim 15, further comprising storing a log of the modifications in the memory device to track the modifications made to the data items or the retention schedule.

17. The apparatus of claim 15, wherein the first duration is less than, equal to, or greater than the second duration.

18. An apparatus for global data management comprising:
a memory device storing data items classified according to a hierarchical classification structure comprising global data of an organization and a retention schedule corresponding to the global data, wherein the retention schedule comprises a plurality of retention rules including a global retention rule for retaining the data items to expiration of a first duration, and at least one exception rule for retaining specific data items to expiration of a second duration, if the at least one exception rule applies to the specific data items, and wherein the hierarchical classification structure corresponds to a taxonomy database schema that includes:
a function layer defining a business of the organization and a parent function node of the organization, the function layer being associated with a first level in the hierarchical classification structure;
an activity layer defining business processes of the function layer and an activity node corresponding to the parent function node, the activity layer being associated with a second level that is lower than the first level in the hierarchical classification structure; and
a record series layer defining the global data produced by the business processes and including a record series node that is a child of the activity node, the record series node identifying a type of record generated based on execution of an activity corresponding to the activity node, the record series layer being associated with a third level, wherein the third level is lower than the second level in the hierarchical classification structure and the retention schedule is assigned to the global data in the record series layer; and
a data processor, coupled to the memory device, performing the steps of:
sending an electronic notification to a user device upon completion of at least one of the first duration and the second duration to indicate that the data items will be deleted if a response from the user device is not received within a predetermined period of time; and
deleting the one or more expired data items and the corresponding retention schedule from the memory device, when a response to the electronic notification is not received within the predetermined period of time.

19. The apparatus of claim 18, wherein the retention schedule further comprises a first trigger event that defines, when triggered, a start date of the first duration that is associated with the global retention rule, and a second trigger event that defines, when triggered, a start date of the second duration that is associated with the at least one exception rule.

20. The apparatus of claim 18, wherein the data processor causes the memory device to perform at least one of adding new data items, deleting existing data items, and updating the retention schedule stored in the memory device.

21. The apparatus of claim 20, further comprising reclassifying the data items according to the hierarchical classification structure and modifications made to the data items or the retention schedule stored in the memory device.

22. The apparatus of claim 20, further comprising storing a log of the modifications in the memory device to track the modifications made to the data items or the retention schedule.

23. A computer program product, tangibly embodied in a computer-readable storage medium, including instructions for execution by a processor for performing a method for global data management, the method comprising:
storing, in a memory device, at least one arrangement of data items classified according to a hierarchical classification structure providing a normalization scheme for classifying the data items, the data items comprising global data of an organization and a retention schedule corresponding to the global data, wherein the hierarchical classification structure corresponds to a taxonomy database schema that includes:
a function layer defining a business of the organization and a parent function node of the organization, the function layer being associated with a first level in the hierarchical classification structure;
an activity layer defining business processes of the function layer and an activity node corresponding to the parent function node, the activity layer being associated with a second level that is lower than the first level in the hierarchical classification structure; and
a record series layer defining the global data produced by the business processes and including a record series node that is a child of the activity node, the record series node identifying a type of record generated based on execution of an activity corresponding to the activity node, the record series layer being associated with a third level, wherein the third level is lower than the second level in the hierarchical classification structure and the retention schedule is assigned to the global data in the record series layer; and
retaining the data items according to the retention schedule, wherein the retention schedule comprises a plurality of retention rules including a global retention rule defining a first duration for retaining the data items consistent with a set of predetermined requirements, and at least one exception rule for retaining at least one data item for a second duration,
wherein the data items are retained in the memory device until at least the expiration of the first duration and wherein specific data items are retained until expiration of the second duration if the at least one exception rule applies to the specific data items.

24. A method for global data management, comprising:
storing at least one arrangement of information classified according to a hierarchical classification structure providing a normalization scheme for classifying the information, the information comprising records of an organization and a retention schedule corresponding to the records, wherein the hierarchical classification structure corresponds to a taxonomy database schema that includes:
a function layer defining a business of the organization and a parent function node of the organization, the function layer being associated with a first level in the hierarchical classification structure;
an activity layer defining business processes of the function layer and an activity node corresponding to the parent function node, the activity layer being associated with a second level that is lower than the first level in the hierarchical classification structure; and a record series layer defining the global data produced by the business processes and including a record series node that is a child of the activity node, the record series node identifying a type of record generated based on execution of an activity corresponding to the activity node, the record series layer being associated with a third level, wherein the third level is lower than the second level in the hierarchical classification structure and the retention schedule is assigned to the global data in the record series layer; and retaining the information according to the retention schedule, wherein the retention schedule comprises a plurality of retention rules including a global retention rule defining a first duration for retaining the information consistent with a set of predetermined requirements, at least one exception rule for retaining at least one record for a second duration, and meta data that provides a link to associate the plurality of retention rules and the at least one exception rule to source data, wherein the information is retained until at least the expiration of the first duration and wherein specific records are retained until expiration of the second duration if the at least one exception rule applies to the specific records; and sending an electronic notification to a user device upon completion of at least one of the first duration and the second duration to indicate that the records will be deleted if a response from the user device is not received within a predetermined period of time.

25. The method of claim 24, wherein the records comprise at least one of paper or electronic documents.

26. The method of claim 24, wherein the first duration is less than, equal to, or greater than the second duration.

* * * * *